United States Patent [19]

Setzer et al.

[11] Patent Number: 4,693,882

[45] Date of Patent: Sep. 15, 1987

[54] STEAM REFORMING UTILIZING SULFUR TOLERANT CATALYST

[75] Inventors: Herbert J. Setzer, Ellington; Sam Karavolis, East Hampton; John A. S. Bett, Hamden, all of Conn.

[73] Assignee: International Fuel Cells Corporation, South Windsor, Conn.

[21] Appl. No.: 946,333

[22] Filed: Dec. 24, 1986

Related U.S. Application Data

[62] Division of Ser. No. 857,688, Apr. 30, 1986.

[51] Int. Cl.[4] .............................................. C01B 1/02
[52] U.S. Cl. ...................................... 423/652; 502/303
[58] Field of Search .......................................... 423/652

[56] References Cited

U.S. PATENT DOCUMENTS

| 4,473,543 | 9/1984 | Setzer et al. | 423/652 |
| 4,503,029 | 3/1985 | Setzer | 423/652 |
| 4,522,802 | 6/1985 | Setzer et al. | 423/652 |

Primary Examiner—John Doll
Assistant Examiner—Wayne A. Langel
Attorney, Agent, or Firm—William J. Sapone

[57] ABSTRACT

High activity sulfur tolerant steam reforming catalysts are described comprising iridium, palladium or platinum supported on lanthanum stabilized alumina or magnesium promoted lanthanum stabilized alumina. The catalysts have improved activity over conventionally used catalysts in the presence of sulfur containing hydrocarbon fuels, particularly in a steam reforming environment. The catalysts have utility in autothermal, tubular, cyclic and adiabatic steam reforming processes.

18 Claims, 1 Drawing Figure

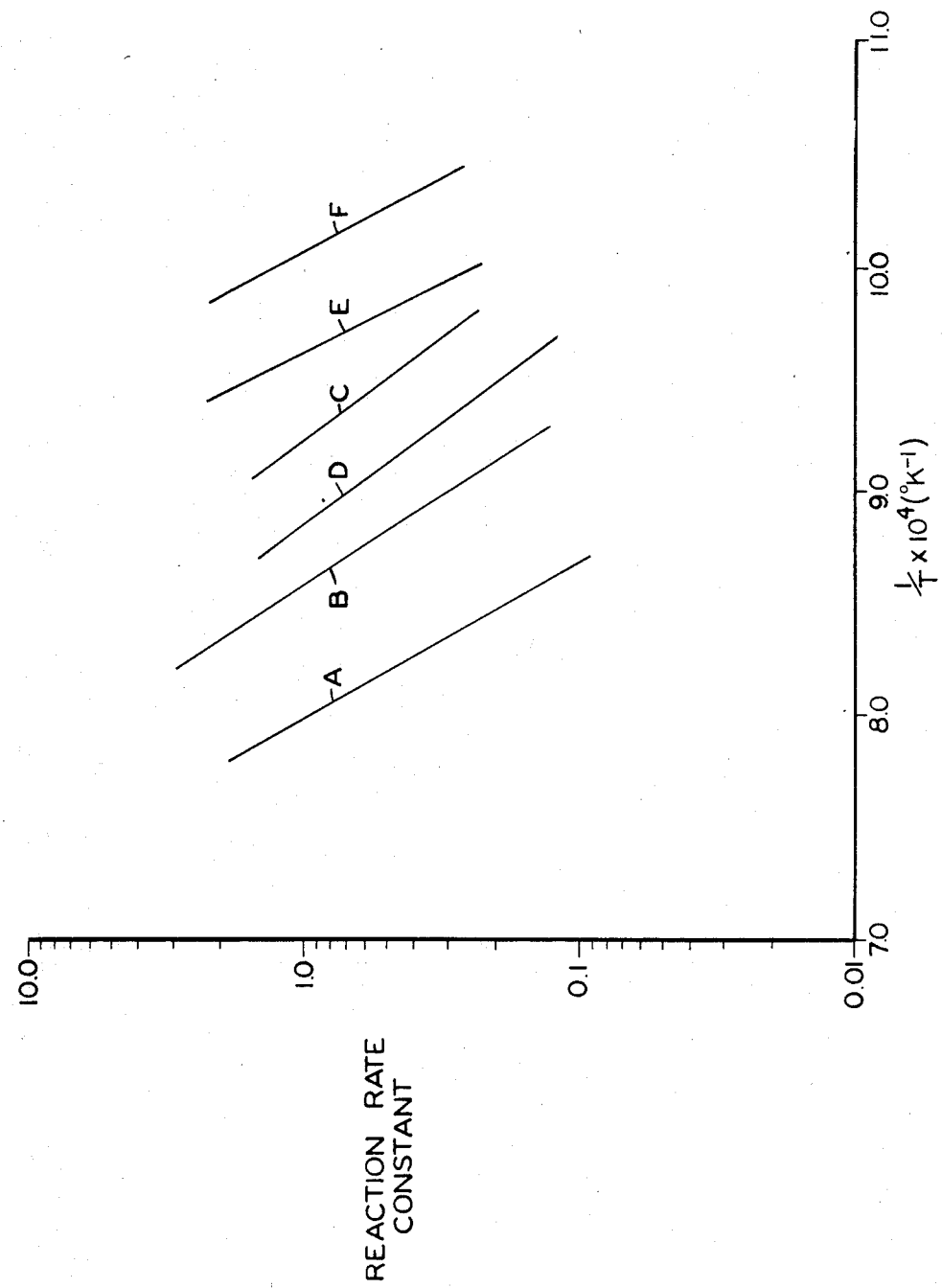

STEAM REFORMING UTILIZING SULFUR TOLERANT CATALYST

This is a division of application Ser. No. 857,688 filed on Apr. 30, 1986.

TECHNICAL FIELD

This invention relates to catalysts and more particularly to steam reforming catalysts for gaseous or liquid hydrocarbons.

BACKGROUND ART

Generally, catalytic production of hydrogen from hydrocarbon material is a two-step steam reforming process. A gaseous or liquid hydrocarbon feed stream is contacted with a catalyst and steam at high temperature, producing hydrogen, carbon monoxide, and carbon dioxide. These products are then cooled and contacted with a shift conversion catalyst which promotes reaction of the carbon monoxide with steam, producing additional hydrogen and carbon dioxide.

Prior to steam reforming, the hydrocarbon material is generally desulfurized to prevent poisoning of the catalytic surfaces. While steam reforming can still be affected with the poisoned catalyst, catalytic activity is reduced by several orders of magnitude. Generally, steam reformers are operated at higher temperatures to partially compensate for this reduced activity. This significantly increases energy requirements while accelerating catalytic decay.

Various processes exist for desulfurizing a hydrocarbon material. One desulfurization process involves treating with hydrogen in the presence of a hydrodesulfurization catalyst. This converts any sulfur in the hydrocarbon feed stream to hydrogen sulfide which is readily removed by adsorption on zinc oxide. However, such a process cannot be used to desulfurize heavier distillate fuels such as No. 2 fuel oil. Such fuels are therefore not considered suitable fuels for steam reforming.

In commonly owned U.S. Pat. No. 4,414,140, issued to H. J. Setzer, high activity sulfur tolerant steam reforming catalysts are described comprising rhodium or nickel supported on lanthanum stabilized alumina or magnesium promoted lanthanum stabilized alumina. In commonly owned U.S. Pat. No. 4,503,029, issued to H. J. Setzer, the improved steam reforming processes, utilizing the above catalysts, are described. While such catalysts have been successfully employed, the search continues for catalysts which achieve even higher activities with improved sulfur tolerance.

DISCLOSURE OF THE INVENTION

It is an object of the present invention to provide a steam reforming catalyst which is highly sulfur tolerant, providing efficient steam reforming of sulfur bearing hydrocarbon fuels, including No. 2 fuel oil.

It is a further object of the present invention to provide a steam reforming catalyst which maintains optimum conversion efficiency at minimized reformer operating temperatures, thereby maximizing energy efficiency with either gaseous or liquid hydrocarbon feed material.

These and other objects of the present invention are achieved by utilizing a catalyst comprising palladium, platinum, or iridium supported on a lanthanum stabilized alumina substrate. Such catalysts have been shown to maintain high activity with gaseous and liquid hydrocarbons, exhibiting high sulfur tolerance and increased life.

Another aspect of the invention comprises such catalysts supported on a magnesium promoted lanthanum stabilized alumina substrate.

Another aspect of the invention includes an autothermal reforming process utilizing the catalyst system according to the present invention.

Another aspect of this invention includes a tubular steam reforming process utilizing the catalyst system according to the present invention.

The foregoing, and other features and advantages of the present invention, will become more apparent from the following description and accompanying drawing.

BRIEF DESCRIPTION OF THE DRAWING

The FIGURE illustrates the catalytic activities of the inventive catalysts as compared to conventionally used steam reforming catalysts.

BEST MODE FOR CARRYING OUT THE INVENTION

The active catalytic components according to the present invention are iridium, palladium, and platinum deposited on a substrate support material. The choice of a substrate material is particularly important to stability of the catalysts at elevated temperatures. For the iridium, palladium, and platinum catalyst systems, either a lanthanum stabilized alumina or a magnesium promoted lanthanum stabilized alumina support meterial is used. The lanthanum stabilized alumina is a commercially available catalyst support material manufactured by W. R. Grace and Co. (Grace SRDX-1/79-1). The magnesium promoted lanthanum stabilized alumina is prepared by impregnating the lanthanum stabilized alumina with a solution (preferably aqueous) of a magnesium salt (preferably magnesium nitrate) followed by drying to remove the solvent, and calcining in air to oxidize the deposited salt to magnesium oxide. Calcining temperatures may vary depending on the particular salt used, but generally temperatures in the range of about 1800° F. (982° C.) are used, e.g. for magnesium nitrate. Enough magnesium salt is deposited on the support material such that after calcining about 3% to about 15% magnesium is present in the support material, and preferably about 5% by weight.

In addition to maintaining stability at elevated temoeratures, the lanthanum stabilized alumina maintains a high BET (Bruinauer-Emmett-Teller) surface area, dimensional stability and sufficient crush strength, especially when magnesium promoted. This substrate material particularly promotes formation of small metal crystallites on the surface which are necessary for catalytic performance, and has higher resistance to carbon formation over other materials such as unmodified alumina.

The active catalytic material, either iridium, palladium, or platinum, is deposited on the substrate material by any conventional method. Generally, metal salts are dissolved in either aqueous or organic solvents and dried on a substrate and then treated with hydrogen to form metal crystallites. While metal deposition from the nitrates is preferred, any acceptable route to form the metal crystallites on a substrate material may be used, such as hydrogen reduction of the salt to form the metal crystallites or oxidation of the salt in air followed by reduction in hydrogen. The amounts of iridium, palladium, or platinum used may vary over a wide range, but are generally used in amounts based on catalyst plus support material of 0.01% to 6.0% by weight platinum, 0.5% to 15.0% palladium, and 0.01% to 6.0% iridium. Typically, amounts of 0.1% to 1.0% platinum or iridium, and 1.0% to 5.0% palladium are preferred.

The inventive catalysts provide improved sulfur tolerance in tubular reformers, autothermal reformers, adiabatic reformers, and cyclic reformers. Such reformers vary in the manner in which heat is supplied for the endothermic reforming reaction. In a tubular reformer, such as that disclosed in commonly assigned U.S. Pat. No. 4,098,589, which is incorporated by reference, the heat is supplied through the walls of a cylinder to the catalyst material. In an autothermal reformer, such as that disclosed in commonly assigned U.S. Pat. No. 3,976,507, which is incorporated by reference, the heat is supplied to the catalyst bed directly by the heated gases entering the reformer. In a cyclic reformer, such as that disclosed in commonly assigned U.S. Pat. No. 4,293,315, which is incorporated by reference, a plurality of reformers are operated simultaneously with one set of reformers, operating under a combustion phase (reacting fuel and air), providing the necessary heat for the hydrogen production phase and the other set of reformers, operating under the hydrogen production phase, (reacting hydrocarbon and steam), switching phases when the temperature of the reformers in the hydrogen production phase drops below that necessary to sustain hydrogen production. An adiabatic reformer utilizes a conventional heat exchanger to supply the requisite heat to the steam and hydrocarbon prior to passage into the steam reformer.

As stated above, in the autothermal reforming process fuel, steam and preheated air are mixed and passed over the catalyst bed. The air is added to the reactants to raise the temperature of the reactants and supply the endothermic heat for reaction. In order to operate efficiently, the quantity of air added must be kept to a minimum. A representative ratio of oxygen to carbon in the hydrocarbon is 0.35 to 1. This tends to lower reaction temperature and increase the activity requirements for any catalysts used in this environment. At operating temperatures, conventional steam reforming catalysts such as nickel on aplha alumina are deficient in activity and nickel on transition alumina lacks the surface area integrity and stability required for long term use.

While iridium, palladium and platinum catalysts according to the present invention can be used alone, a particularly attractive arrangement for the autothermal reformer includes the use of an inlet portion of iron oxide or other high temperature carbon tolerant catalyst in such reformer. In this inlet region, all the oxygen reacts with the hydrocarbon and temperatures increase very rapidly. Downstream of this region, the reactor is loaded with the high activity iridium, palladium or platinum catalyst of the present invention. In this latter region, hydrocarbon and reaction intermediates react with steam. Due to the endothermic nature of the reaction with steam, temperatures drop, and it is important to have a high activity catalyst in this region. The use of such a multiple catalyst system allows greater flexibility in the maximum allowable reactor temperature and the method of introducing the air into the reactor.

Although the steam reforming catalyst according to the present invention are not limited to fuel cell aoplications, when used for this purpose, sulfur containing fuels ranging from sulfur containing natural gas to heavier sulfur containing fuels such as No. 2 fuel oil can be successfully steam reformed. Synthetic fuels such as gasified coal and coal derived liquids as well as hydrocarbons derived from sources other than petroleum, such as shale oil, are suitable for use with the present invention.

EXAMPLE 1

A lanthanum stabilized alumina catalyst support material was purchased from W. R. Grace and Company in pellet form having dimensions of about 0.318 centimeters diameter and about 0.318 centimeters length. An aqueous solution is prepared by adding 0.221 grams of platinum diaminonitrite to 12 milliliters water, then adding 8 milliliters of concentrated nitric acid. The lanthanum stabilized alumina pellets are then immersed in the aqueous solution for five minutes with ultrasonic vibration and then 30 minutes without vibration. The pellets are then removed from the solution and dried in air for 3.5 hours at 110° C.

The treated pellets are placed in an oven which is alternatively evacuated and filled with nitrogen three times. The temperature is raised to approximately 316° C. and a gradual change in atmosphere from nitrogen to hydrogen undertaken. (See Table 1)

TABLE 1

| % $N_2$ | % $H_2$ | Time in Hours |
|---|---|---|
| 100 | 0 | 0.25 |
| 95 | 5 | 0.25 |
| 90 | 10 | 0.25 |
| 75 | 25 | 0.50 |
| 0 | 100 | 2.00 |

The pellets are cooled to 93° C. as the atmosphere is changed from 100% hydrogen to 100% nitrogen. The pellets are then further cooled to room temperature as the atmosphere is gradually adjusted to ambient conditions by the addition of oxygen. (See Table 2).

TABLE 2

| % $N_2$ | % $O_2$ | Time in Hours |
|---|---|---|
| 95 | 5 | 0.5 |
| 90 | 10 | 0.5 |
| 80 | 20 | 0.5 |

EXAMPLE 2

The following reactants were steam reformed in an isothermal tubular steam reformer. Although only a micro reformer was employed having a capacity of 0.5 grams of catalyst material, the ratios used apply to any size reformer.

| Tubular Reformer (Isothermal) | | | | |
|---|---|---|---|---|
| Reactants | | | | |
| $CH_4$ space velocity | 2.19 (g/hr)/g catalyst | | | |
| $H_2O/CH_4$ ratio | 4.05 | | | |
| $H_2/CH_4$ ratio | 0.365 | | | |
| $H_2S$ concentrations | 2300 parts per million by weight | | | |
| Pressure | 1 atmosphere | | | |
| Platinum catalyst -- 1.0 weight % platinum on lanthanum stabilized alumina. Size 35-60 mesh. | | | | |
| Temperature, °C. | 687 | 700 | 715 | 726 |
| % Conversion of hydrocarbon to oxides of carbon | 12.5 | 18.5 | 30.5 | 39.9 |
| Reaction rate constant (k) | 0.29 | 0.46 | 0.80 | 1.11 |

-continued

Tubular Reformer (Isothermal)

Iridium catalyst -- 1 wt. % iridium on lanthanum stabilized alumina. Size 35–60 mesh.

| Temperature. °C. | 727 | 740 | 758 | 774 | 784 |
|---|---|---|---|---|---|
| % Conversion of hydrocarbon to oxides of carbon | 10.8 | 16.0 | 30.1 | 50.9 | 65. |
| Reaction rate constant (k) | 0.249 | 0.381 | 0.779 | 1.55 | 5.54 |

Palladium catalyst -- 1 wt. % rhodium on lanthanum stabilized alumina. Size 35–60 mesh.

| Temperature. °C. | 755 | 781 | 819 | 851 | 882 |
|---|---|---|---|---|---|
| % Conversion of hydrocarbon to oxides of carbon | 4.7 | 7.6 | 17.1 | 29.1 | 45. |
| Reaction rate constant (k) | 0.106 | 1.175 | 0.411 | 0.735 | 1.32 |

The reaction rate constant (k) (synonymous with activity) is defined by the pseudo-first rate equation:

$$k = (\text{space velocity}) \times \text{Ln} \frac{1}{1 - \frac{\% \text{ conversion}}{100}}$$

In the FIGURE, the data for the catalysts is shown on a conventional Arrhenius graph. In this graph, the reaction rate constant k is plotted against the reciprocal of the absolute test temperatures. For comparative purposes, a plot of conventional 15% nickel catalyst on alpha alumina (A) is shown. Also shown are the improved nickel catalyst (B) and rhodium catalysts (C) of U.S. Pat. No. 4,414,140. In the above testing, a switch in sulfur contamination from hydrogen sulfide to such compounds as dimethyl sulfide, t-butylmercaptan, or tetrahydrothiophene, did not substantially affect catalyst performance. Changes in catalyst loading on the substrate material from 0.1 to 6.0% by weight platinum have shown a linear increase in rate constant up to about 1.0% to 1.5% by weight, at which point the curve flattens out.

From the figure, the order of activity proceeds from palladium (D) to iridium (E) to platinum (F) with all providing higher activity than the commercially available catalyst (A). When compared to the improved nickel and rhodium catalysts, palladium is between while iridium and platinum display significantly higher activity. While mixtures of these materials can be used, such mixtures do not impart any advantages because of the phenomena of surface enrichment where the less active catalytic material tends to migrate to the surface of the formed composite metal particles. While platinum is the most active catalyst as shown in the FIGURE, a number of factors must be weighted to determine the most suitable catalyst for a particular application.

The catalytic material according to the present invention provides high activity in a steam reforming environment with improved sulfur tolerance. These catalysts also allow reactors to be operated at lower temperatures with greater efficiencies allowing less expensive construction materials to be used. This provides particular advantages for adiabatic, autothermal and tubular steam reforming. While these catalysts have been described for use in steam reforming processes utilizing sulfur containing fuels, they could be used in conventional sulfur-free steam reforming processes as well.

While this invention has been described in relation to steam reforming catalysts used in fuel cell applications, it will be understood by those skilled in the art that various changes in terms of reformer design or catalyst loading can be made without varying from the present invention.

We claim:

1. In a steam reforming process for converting hydrocarbon material to hydrogen gas in the presence of sulfur comprising adding steam to the hydrocarbon material and passing the steam and hydrocarbon material over catalyst material at elevated temperatures, wherein the improvement comprises utilizing as a catalyst material high activity, sulfur tolerant catalyst of platinum supported on lanthanum stabilized alumina or magnesium promoted lanthanum stabilized alumina.

2. The process of claim 1 wherein the reactant mixture is brought to the requisite elevated temperature by transfer of heat through the metal walls of a reactor containing the catalyst material.

3. The process of claim 1 wherein the reactant mixture is brought to the requisite elevated temperature by preheating air and adding it to the reactant mixture prior to contact with the catalyst material.

4. The process of claim 1 wherein the reactant mixture is brought to the requisite elevated temperature by preheating in a heat exchanger prior to contact with the catalyst material.

5. The process of claim 1 wherein the catalyst material is brought to the requisite elevated temperature by contacting the catalyst material with combusted gases followed by contact with the reactant mixture in a sequential operation.

6. The process of claim 1 wherein the hydrocarbon material is No. 2 fuel oil.

7. In a steam process for converting hydrocarbon material to hydrogen gas in the presence of sulfur comprising adding steam to the hydrocarbon material and passing the steam and hydrocarbon material over catalyst material at elevated temperatures wherein the improvement comprises utilizing as a catalyst material high activity, sulfur tolerant catalysts consisting essentially of iridium supported on lanthanum stabilized alumina or magnesium promoted lanthanum stabilized alumina.

8. The process of claim 7 wherein the reactant mixture is brought to the requisite elevated temperature by transfer of heat through the metal walls of a reactor containing the catalyst material.

9. The process of claim 7 wherein the reactant mixture is brought to the requisite elevated temperture by preheating air and adding it to the reactant mixture prior to contact with the catalyst material.

10. The process of claim 7 wherein the reactant mixture is brought to the requisite elevated temperature by preheating in a heat exchanger prior to contact with the catalyst material.

11. The process of claim 7 wherein the catalyst material is brought to the requisite elevated temperature by contacting the catalyst material with combusted gases followed by contact with the reactant mixture in a sequential operation.

12. The process of claim 7 wherein the hydrocarbon material is No. 2 fuel oil.

13. In a steam reforming process for converting hydrocarbon material to hydrogen gas in the presence of sulfur comprising adding steam to the hydrocarbon material and passing the steam and hydrocarbon material over catalyst material at elevated temperatures wherein the improvement comprises utlilizing as a catalyst material high activity sulfur tolerant catalysts consisting essentially of palladium supported on lanthanum stabilized alumina or magnesium promoted lanthanum stabilized alumina.

14. The process of claim 13 wherein the reactant mixture is brought to the requisite elevated temperature by transfer of heat through the metal walls of a reactor containing the catalyst material.

15. The process of claim 13 wherein the reactant mixture is brought to the requisite elevated temperture by preheating air and adding it to the reactant mixture prior to contact with the catalyst material.

16. The process of claim 13 wherein the reactant mixture is brought to the requisite elevated temperature by preheating in a heat exchanger prior to contact with the catalyst material.

17. The process of claim 13 wherein the catalyst material is brought to the requisite elevated temperature by contacting the catalyst material with combusted gases followed by contact with the reactant mixture in a sequential operation.

18. The process of claim 13 wherein the hydrocarbon material is No. 2 fuel oil.

* * * * *